(12) United States Patent
Yokoi et al.

(10) Patent No.: US 9,152,077 B2
(45) Date of Patent: Oct. 6, 2015

(54) DEVELOPING DEVICE, BLADE UNIT, AND DEVELOPING DEVICE MANUFACTURING METHOD

(71) Applicant: Brother Kogyo Kabushiki Kaisha, Nagoya-shi, Aichi-ken (JP)

(72) Inventors: Junichi Yokoi, Nagoya (JP); Hikaru Yoshizumi, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/230,916

(22) Filed: Mar. 31, 2014

(65) Prior Publication Data

US 2015/0093157 A1 Apr. 2, 2015

(30) Foreign Application Priority Data

Sep. 30, 2013 (JP) .................................. 2013-205680
Sep. 30, 2013 (JP) .................................. 2013-205712

(51) Int. Cl.
  *G03G 15/08* (2006.01)
  *B23K 26/22* (2006.01)
  *B23K 26/20* (2014.01)

(52) U.S. Cl.
  CPC ............ *G03G 15/0812* (2013.01); *B23K 26/20* (2013.01); *B23K 26/22* (2013.01)

(58) Field of Classification Search
  CPC combination set(s) only.
  See application file for complete search history.

(56) References Cited

U.S. PATENT DOCUMENTS

| 6,175,708 | B1* | 1/2001 | Ohashi et al. .................. 399/274 |
| 2001/0031158 | A1 | 10/2001 | Yokomori et al. |
| 2004/0120734 | A1* | 6/2004 | Okamoto ...................... 399/284 |
| 2006/0024085 | A1 | 2/2006 | Sato et al. |
| 2008/0118280 | A1 | 5/2008 | Han et al. |
| 2009/0188897 | A1 | 7/2009 | Margairaz et al. |
| 2012/0272611 | A1 | 11/2012 | Tsukimoto et al. |

(Continued)

FOREIGN PATENT DOCUMENTS

| EP | 1394629 A1 | 3/2004 |
| GB | 2342881 A | 4/2000 |
| JP | 57-78574 A | 5/1982 |
| JP | 2001-356592 A | 12/2001 |
| JP | 2006-145932 A | 6/2006 |
| JP | 2008290083 A | 12/2008 |

OTHER PUBLICATIONS

Feb. 23, 2015—(US) Non-Final Office Action—U.S. Appl. No. 14/230,755.

(Continued)

*Primary Examiner* — Clayton E Laballe
*Assistant Examiner* — Jas Sanghera
(74) *Attorney, Agent, or Firm* — Banner & Witcoff, Ltd.

(57) ABSTRACT

Aspects include an apparatus, a blade assembly, and a method for manufacturing the apparatus with the blade assembly. The apparatus may include a developer carrier for carrying developer and a blade assembly. The blade assembly may include a blade disposed adjacent to the developer carrier and configured to regulate an amount of developer on the developer carrier. The blade may include a weld mark joining the blade to the supporting member. A first dimension of the weld mark in a first direction may be greater than a second dimension of the weld mark in a second direction perpendicular to the first direction, and a third dimension of the weld mark in a third direction may be a dimension of the thickness of the blade. The weld mark may be formed by irradiating a laser beam onto the blade while moving the laser beam or the blade.

25 Claims, 11 Drawing Sheets

(56) References Cited

U.S. PATENT DOCUMENTS

2013/0170876 A1 7/2013 Brown et al.
2013/0232749 A1 9/2013 Bruck et al.

OTHER PUBLICATIONS

European Search Report issued Feb. 18, 2015 for European Application No. 14186531.1.

Feb. 11, 2015—(US) Non-Final Office Action—U.S. Appl. No. 14/230,502.

European Search Report issued Mar. 20, 2015 in European Application No. 14186524.6.

Tritium: "Solar Panel Tig welding" Retrieved from the Internet: URL: http://weldingweb.com/showthread.php?57437?Solar?Panel?Tig?welding&p=523926#post523926 last visited on May 21, 2015.

* cited by examiner

DEVELOPING DEVICE, BLADE UNIT, AND DEVELOPING DEVICE MANUFACTURING METHOD

CROSS-REFERENCE TO RELATED APPLICATION

This application claims priority from Japanese Patent Application No. 2013-205680, filed on Sep. 30, 2013, and Japanese Patent Application No. 2013-205712, filed on Sep. 30, 2013, which are incorporated herein by reference in their entirety.

TECHNICAL FIELD

Aspects disclosed herein relate to a blade unit in which a blade is joined to a supporting member by welding, a developing device using the blade unit, and a manufacturing method of the developing device.

BACKGROUND

Conventionally, there has been an electrophotographic image forming apparatus that includes a developing device including a developing roller and a blade unit for regulating a thickness of a developer layer held on the developing roller. Further, there has been known a blade unit that includes a blade that contacts the developing roller and a supporting member that holds the blade in an overlapping manner.

In the blade unit, the blade and the supporting member are welded to each other at a plurality of locations along the blade in an extended dimension of the blade, and the blade may be formed with a plurality of spot-like weld marks thereon.

SUMMARY

In some cases, where the welded portions of the blade and the supporting member have a small spot-like shape as a result of using the above-described technique, each of the welded portions might not have a fixing strength that is strong enough to support the blade, and therefore, the blade might not be securely fixed to the supporting member.

Accordingly, for example, aspects of the disclosure provide for a developing device, a blade assembly, and a developing device manufacturing method in which a blade may be securely fixed to a supporting member.

Aspects of the disclosure describe an apparatus comprising a developer carrier, a blade, and a supporting member. The blade may be disposed adjacent to the developer carrier. The supporting member may be configured to support the blade. Further, the blade may comprise a weld mark joining the blade to the supporting member. A first dimension of the weld mark in a first direction is greater than a second dimension of the weld mark in a second direction perpendicular to the first direction. Meanwhile, a third dimension of the weld mark in a third direction, the third direction being perpendicular to the first direction and the second direction, is a dimension of the thickness of the blade. In some embodiments, the weld mark may have an elongated shape. For example, the first dimension may be 1.1 times or greater than the second dimension. Also, the first dimension may be parallel to a direction of a longest dimension of the blade.

Aspects of the disclosure also provide a blade assembly comprising a blade and a supporting member. The blade may be configured to regulate an amount of developer on a developer carrier, and the supporting member may be configured to support the blade. For example, the supporting member may be configured to support the blade in a position so that it may regulate an amount of the developer on the developer carrier within a developing device. Further, the blade may comprise a weld mark joining the blade to the supporting member. A first dimension of the weld mark in a first direction is greater than a second dimension of the weld mark in a second direction perpendicular to the first direction. Meanwhile, a third dimension of the weld mark in a third direction, the third direction being perpendicular to the first direction and the second direction, is a dimension of the thickness of the blade.

Additional aspects of the disclosure include methods of manufacturing a developing device. The developing device may comprise a developer carrier, a blade disposed adjacent to the developer carrier, and a supporting member configured to support the blade. An example method for manufacturing such a developing device may include placing the blade in contact with the supporting member. The method may also include welding comprising irradiating a laser beam from a welding machine onto the blade, while moving one of the laser beam and the blade to form a weld mark joining the blade to the supporting member. The moving of one of the laser beam and the blade may include linearly moving one of the laser beam and the blade.

According to the aspects of the disclosure, the blade may be fixed to the supporting member more securely as compared with a case where spot-like weld marks are formed.

This summary is not intended to identify critical or essential features of the disclosure, but instead merely summarizes certain features and variations thereof. Other objects, features, and advantages will be apparent to persons of ordinary skill in the art from the following detailed description of the disclosure and the accompanying drawings.

DESCRIPTION OF THE DRAWINGS

Aspects of the disclosure are illustrated by way of example and not by limitation in the accompanying figures in which like reference characters indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments of the disclosure will be described in detail with reference to the accompanying drawings. Additionally, U.S. patent application Ser. No. 14/230,755 entitled "Developing Device, Blade Unit, and Developing Device Manufacturing Method" is hereby incorporated by reference herein in its entirety.

Figure 1:
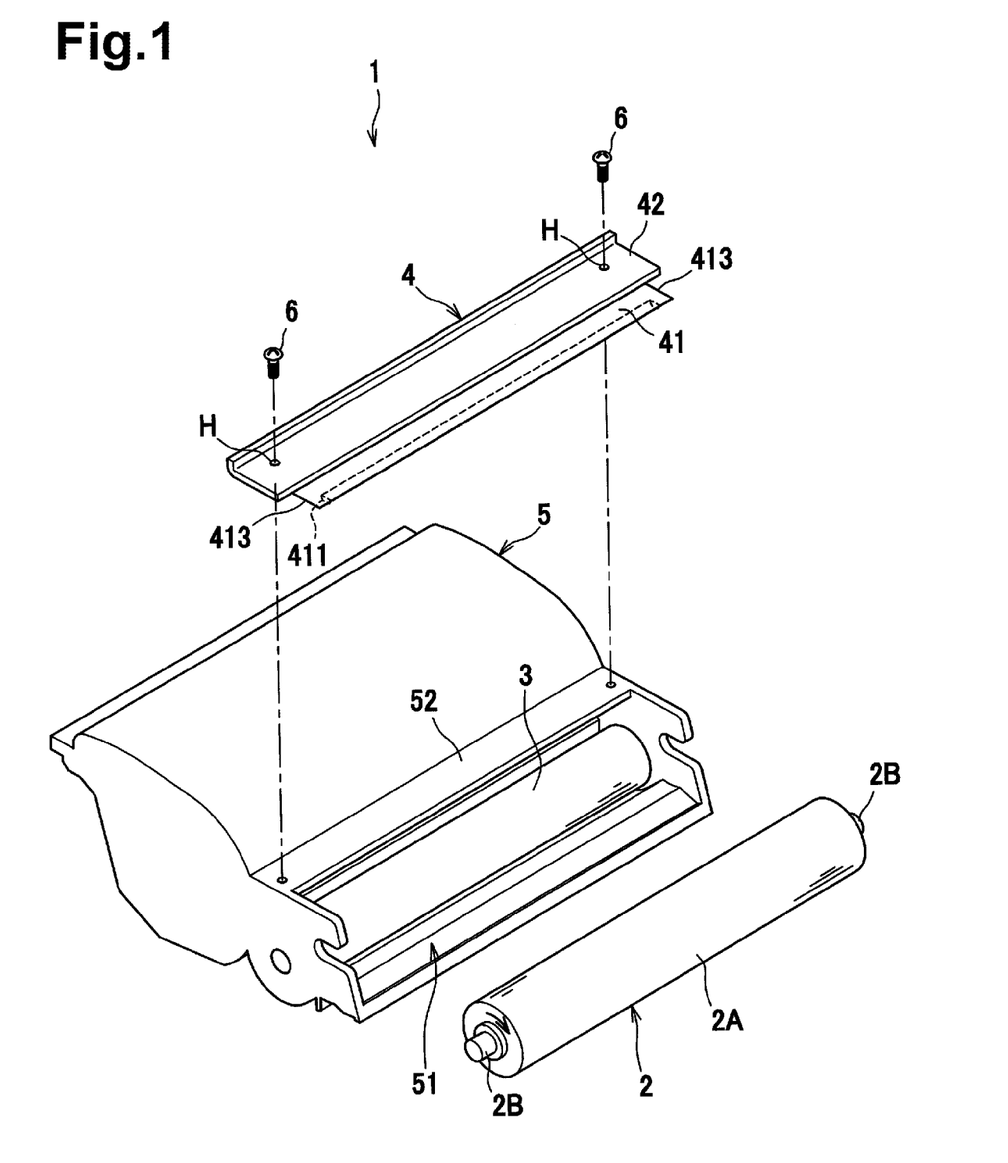
FIG. 1 is a perspective view depicting a developing device in an illustrative embodiment according to one or more aspects of the disclosure.

As depicted in FIG. 1, a developing device 1 may comprise a developing roller 2 (an example of a developer carrier), a supply roller 3, a blade assembly 4 (or blade unit), and a developing case 5 that may hold these components.

The developing case 5 may be a container having therein a toner storage chamber 53 capable of storing toner therein. The developing case 5 may also be formed to define an opening 51 in one of its surfaces. The developing case 5 may define an edge of the opening 51 and comprise a blade support surface 52 to which the blade unit 4 may be fixed.

Figure 2:
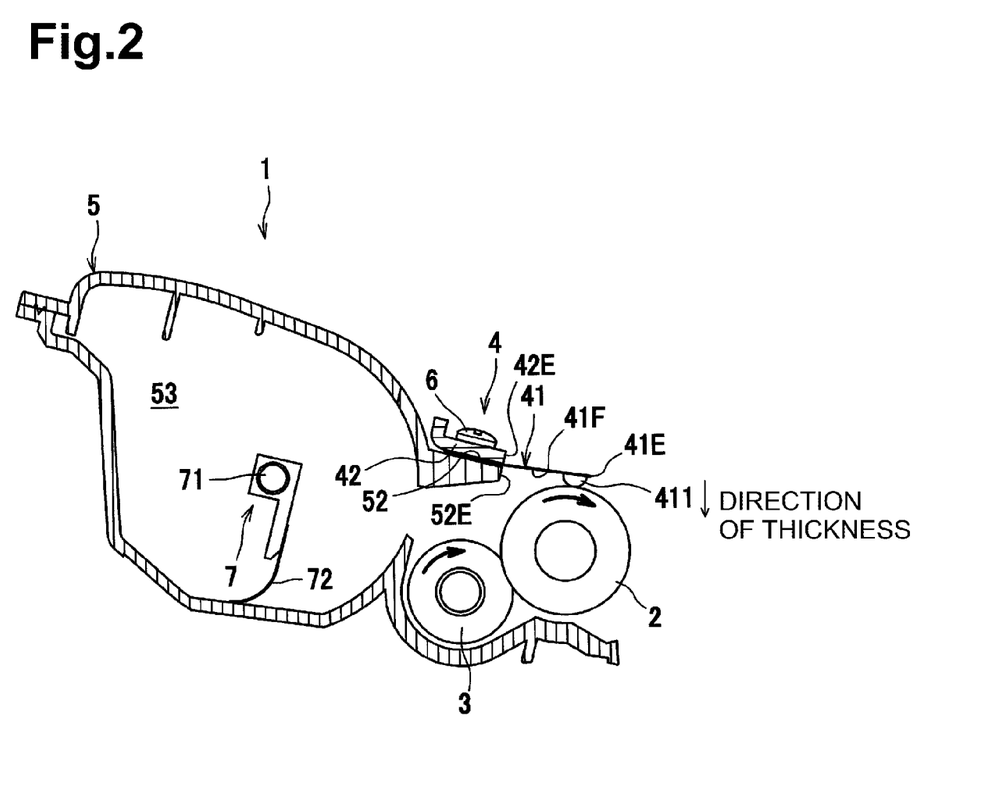
FIG. 2 is a sectional view depicting the developing device in the illustrative embodiment according to one or more aspects of the disclosure.

As depicted in FIG. 2, a conveyor member 7 for conveying toner toward the supply roller 3 may be disposed in the toner storage chamber 53. The conveyor member 7 may comprise a shaft portion 71 that may be rotatably supported by the developing case 5, and a film 72 (or other agitator) that may rotate along with rotation of the shaft portion 71.

As depicted in FIG. 1, the developing roller 2 may comprise a cylindrical roller body 2A and a shaft 2B that may be inserted into the roller body 2A and may rotatably interface with the roller body 2A. The roller body 2A may have elasticity and may be capable of holding toner on its cylindrical surface. The developing roller 2 may be disposed to close or partially close the opening 51 of the developing case 5. The shaft 2B may protrude from the roller body 2A in an axial direction of the developing roller 2 and may be rotatably supported by the developing case 5.

The supply roller 3 may be disposed inside the developing case 5 in contact with the developing roller 2, and may be rotatably supported by the developing case 5. The supply roller 3 may be configured to supply toner stored in the developing case 5 to the developing roller 2 as the developing roller 2 rotates.

The blade assembly 4 (or blade unit) may comprise a blade 41 and a supporting member 42 (an example of a supporter). The blade 41 may be disposed near the developing roller 2 such that a tip of the blade 41 may be placed on the developing roller 2. The supporting member 42 may hold the blade 41.

The blade 41 may comprise sheet metal having an approximately rectangular shape (e.g., sheet metal having two longer sides and two shorter sides). The blade 41 may be positioned so that a longer side of the blade 41 extends in a direction that an axis of the developing roller 2 may extend (hereinafter, this direction may be referred to as the longer direction LD (see FIG. 3A)). That is, a longer side of the blade 41 may be approximately parallel to the axial direction of the developing roller 2, and a shorter side of the blade 41 may be approximately perpendicular to the axial direction of the developing roller 2 (hereinafter, this approximately perpendicular direction may be referred to as the shorter direction SD (see FIG. 3A)). The blade 41 may be made of metallic material, for example, stainless steel. In other embodiments, for example, the blade 41 may comprise a sheet metal whose surface may have a coating including press oil.

For example, the blade 41 may have a thickness of 0.05 to 2.5 mm, a thickness of 0.05 to 0.12 mm, a thickness of 0.05 to 1.00 mm, a thickness of 0.07 to 0.15 mm, or a thickness of 0.08 to 0.12 mm. A longer dimension, as an example of a first dimension (e.g., a length), of the blade 41 (extending in the longer direction that is an example of a first direction) may be greater than a dimension of the roller body 2A of the developing roller 2 in the axial direction. In other words, the longer direction may be a longitudinal direction. For example, the blade 41 may have a length of 218 to 270 mm, a length of 220 to 260 mm, or a length of 222 to 250 mm.

The blade 41 may comprise a contact portion 411, which may protrude toward the developing roller 2 and directly contact the roller body 2A of the developing roller 2. The contact portion 411 may protrude from a distal end 41E of a lower surface 41F (e.g., a surface facing the developing roller 2) of the blade 41 (see FIG. 2). The contact portion 411 may be made of, for example, rubber and may extend in the longer direction of the blade 41.

The supporting member 42 may be a member for fixing or otherwise holding a fixed end of the blade 41 to the developing case 5.

The supporting member 42 may be made of metallic material, for example, electrolytic zinc-coated carbon steel sheet. The supporting member 42 may have a thickness greater than the blade 41 and an approximately or substantially rectangular shape. A longer side of the supporting member 42 may be positioned so that it extends in a direction that is approximately parallel to the longer side of the blade 41. The supporting member 42 may extend so as to exceed both ends 413 of the blade 41. That is, the longer side of the supporting member 42 may be longer than the longer side of the blade 41.

The ends of the supporting member 42 may extend past the ends of the blade 41. The supporting member 42 may extend over the blade 41 on a side opposite to the blade support surface 52 so that the supporting member 42 may pinch the blade 41 in conjunction with the blade support surface 52 of the developing case 5. In other words, the supporting member 42 and blade support surface 52 may be positioned such that the blade 41 is interposed therebetween. The blade 41 may be pinched between an edge 42E of the supporting member 42 and an edge 52E of the support surface 52. A portion, which may contact the edge 42E of the supporting member 42 and the edge 52E of the blade support surface 52, of the blade 41 may function as a fulcrum when the blade 41 bends.

The blade unit 4 configured as described above may be fixed to the developing case 5 using screws 6 through holes H in the blade 41 and the supporting member 42. In this state, the blade unit 4 may be configured to regulate a thickness of a toner layer attaching to the developing roller 2. In particular, the contact portion 411 of the blade 41, which may contact the rotating developing roller 2, may regulate a thickness of the toner layer by blocking excess toner from passing as the developing roller 2 rotates.

Figure 3A:
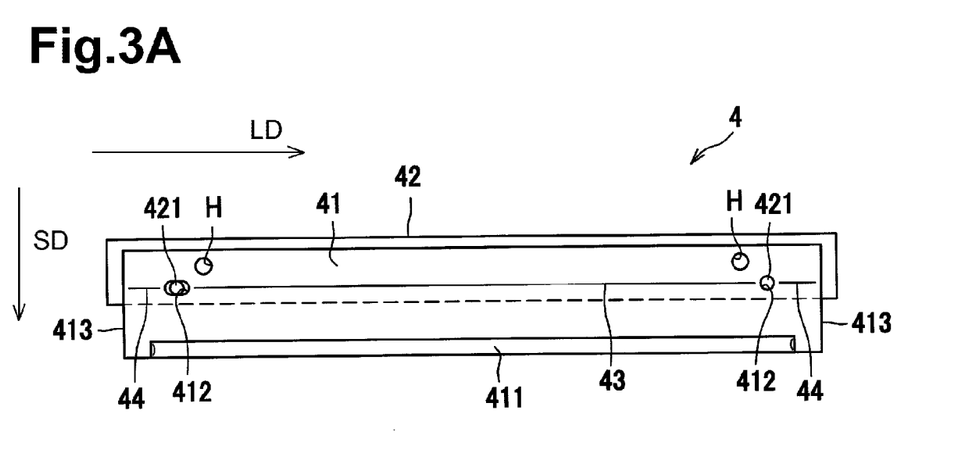
FIG. 3A illustrates a blade unit according to one or more aspects of the disclosure.

As depicted in FIG. 3A, the supporting member 42 may comprise a positioning protrusion 421, which may be engaged with the blade 41, e.g., at opposite ends of the long side of the blade 41. The positioning protrusion 421 may protrude from a surface of the supporting member 42 that faces the blade 41. As shown in the example embodiment of FIG. 3A, the blade 41 may have a pair of openings 412 that may be engaged with a pair of positioning protrusions 421. One of the pair of openings 412 may be a circular opening and the other of the pair of openings 412 may be an elongated opening. The elongated opening of the pair of openings 412 may absorb a dimensional deviation between the two openings 412 and linear expansion of the blade 41 and/or the supporting member 42 in the longer direction that may occur during welding. In other words, for example, the elongated opening 412 may be elongated in order for the blade 41 to stay engaged with one of the positioning protrusions 421 if the blade 41 expands as a result of welding. The blade 41 may be positioned with respect to the supporting member 42 by the engagement of the openings 412 and the corresponding positioning protrusions 421, respectively.

The blade 41 may be welded to the supporting member 42 at a plurality of locations along the blade 41 in the longer direction. More specifically, the blade 41 may be joined to the supporting member 42 by laser welding at multiple portions of the blade 41, including portions of the blade 41 between the positioning protrusions 421 and ends 413 of the blade 41 and portions of the blade 41 between the positioning protrusions themselves.

The blade 41 may have a first weld mark 43, which may join the blade 41 and the supporting member 42 at a position between the positioning protrusions 421, and second weld marks 44, which may join the blade 41 and the supporting member 42 at respective positions located towards an outer edge of the supporting member 42 from the respective positioning protrusions 421 in the longer direction.

The first weld mark 43 may continue from a vicinity of the one of the openings 412 to a vicinity of the other of the openings 412 along the longer direction of the blade 41.

Figure 3B:
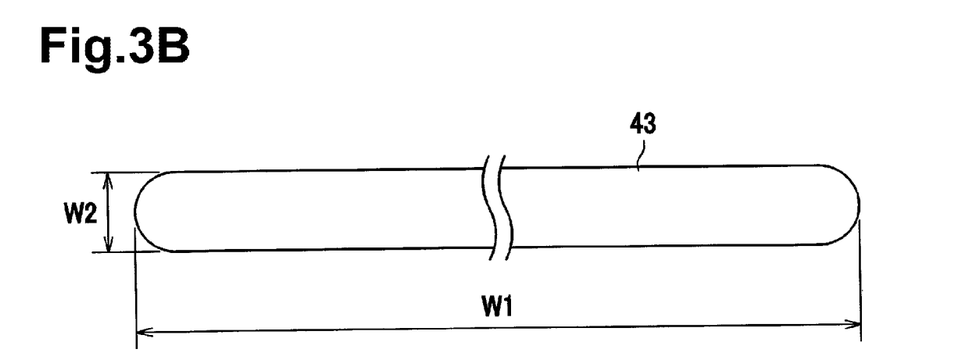
FIG. 3B is an enlarged view of a weld mark according to one or more aspects of the disclosure.

As depicted in FIG. 3B, in the first weld mark 43, a dimension W1 in the longer direction of the blade 41 may be longer than a dimension W2 in the shorter direction, as an example of a second direction, of the blade 41 (e.g., a direction perpendicular to the longer direction). In the first weld mark 43, the dimension W1 in the longer direction of the blade 41 may be 1.1 times or greater, more preferably, 1.5 times or greater, and further preferably, 2.0 times or greater than the dimension W2 as an example of a second dimension in the shorter direction of the blade 41. For example, the first weld mark 43 may have a dimension of 210 to 250 mm in the longer direction of the blade 41 and a dimension of 0.1 to 0.6 mm in the direction perpendicular to the longer direction of the blade 41.

In some embodiments, rather than forming a single weld mark (e.g., the first weld mark 43) between the openings 412 as shown in FIG. 3A, the first weld mark 43 may comprise a plurality of elongated first weld marks formed between the openings 412. In such embodiments, the dimension W1 of each of the first weld marks 43 in the longer direction of the blade 41 may be within a range of 1.1 to 3.0 times, a range of 1.1 to 2.1 times, or a range of 1.5 to 3.5 times as long as the dimension W2 of the first weld marks 43 in the shorter direction of the blade 41. A thickness of the blade 41 is an example of a third dimension. A direction of the third direction is a direction of the thickness of the blade 41.

As depicted in FIG. 3A, the second weld mark 44 may continue from respective vicinities of the openings 412 to respective vicinities of the ends 413 of the blade 41 along the longer direction of the blade 41.

In a similar manner to the first weld mark 43, each second weld mark 44 may have a greater dimension in the longer direction of the blade 41 than a dimension in the shorter direction of the blade 41.

Each of the first weld mark 43 and the second weld marks 44 may have a dimension of 0.2 to 250 mm in the longer direction of the blade 41 and a dimension of 0.1 to 6.0 mm in the shorter direction of the blade 41. In other embodiments, where the first weld mark 43 of FIG. 3A comprises a plurality of weld marks, each of the first weld marks 43 and the second weld marks 44 may have a dimension of 0.1 to 0.4 mm or a dimension of 0.1 to 0.3 mm in the shorter direction of the blade 41.

Hereinafter, advantages of the blade unit 4, configured as described above, are described.

Each of the first weld mark 43 and the second weld marks 44 formed on the blade 41 may have the greater dimension in the longer direction of the blade 41 than the dimension in the shorter direction of the blade 41. Therefore, the blade 41 may be fixed to the supporting member 42 more securely as compared with a case where spot-like weld marks are formed on the blade 41.

In addition, the first weld mark 43 and the second weld marks 44 may be elongated along the longer direction of the blade 41. Therefore, this configuration may reduce a risk that the blade 41 may come apart from the developing roller 2 due to application of a strong force to a particular portion of the blade 41 in a case where the blade 41 is made to contact with the developing roller 2.

Next, a manufacturing method of the developing device 1 is described.

Figures 4A, 4B:
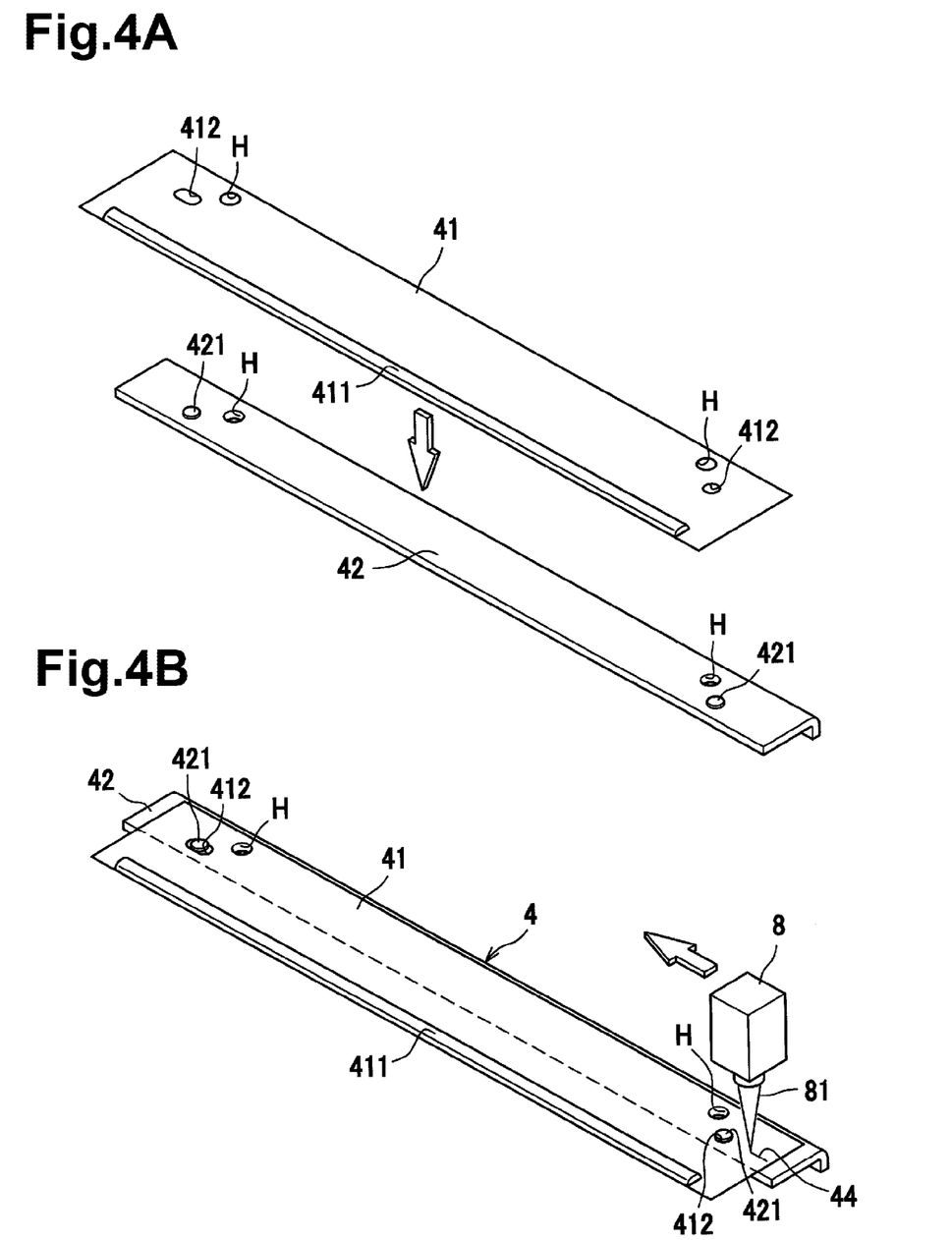
FIG. 4A is a diagram for explaining a preparation process in a developing device manufacturing method according to one or more aspects of the disclosure.
FIG. 4B is a diagram for explaining a welding process in the developing device manufacturing method according to one or more aspects of the disclosure.

First, as depicted in FIG. 4A, when assembling the blade unit 4, the blade 41 may be placed on (e.g., in contact with) the supporting member 42 (e.g., a preparation process). At that time, the openings 412 in the blade 41 may be engaged with the corresponding positioning protrusions 421, respectively, of the supporting member 42.

Then, the blade 41 and the supporting member 42 may be fastened on a worktable. Thereafter, as depicted in FIG. 4B, while a laser beam 81 irradiated from the welding machine 8 is moved with respect to the blade 41, the laser beam 81 may be irradiated onto the blade 41 to weld the blade 41 and the supporting member 42 to each other (e.g., a welding process).

In some embodiments, the welding machine 8 may be configured to irradiate a portion, which may face the welding machine 8, of an object with a continuous wave laser. That is, the laser beam 81 may be, for example, a continuous wave laser. In some embodiments, for example, another welding machine may be used that may be configured to irradiate the blade 41 with a laser beam by moving a reflector provided inside the welding machine, without moving the welding machine itself. For example, a fiber laser may be used as the continuous wave laser. In particular, a fiber laser (which emits a laser beam with a relatively small diameter) may be used so that the continuous wave laser does not cause overheating and/or deformation of the blade 41 and/or the supporting member 42.

In the welding process, by moving the laser beam 81 and continuously irradiating the laser beam 81 onto the blade 41, a weld mark (e.g., the first weld mark 43 and the second weld marks 44) having a greater dimension in the longer direction of the blade 41 than a dimension in the shorter direction may be formed on the blade 41.

At that time, the laser beam 81 may be moved with respect to the blade 41 along the longer direction of the blade 41 from one end portion, in which the circular opening 412 may be defined, to the other end portion, in which the elongated opening 412 may be defined, of the blade 41. The laser beam 81 may be irradiated onto portions of the blade 41 that may be apart from each end of the blade 41 and the edges of the openings 412.

Starting the welding from the circular opening 412 side as described above may allow the elongated opening 412 to absorb a thermal expansion of the blade 41 that may occur during welding.

Figure 5:
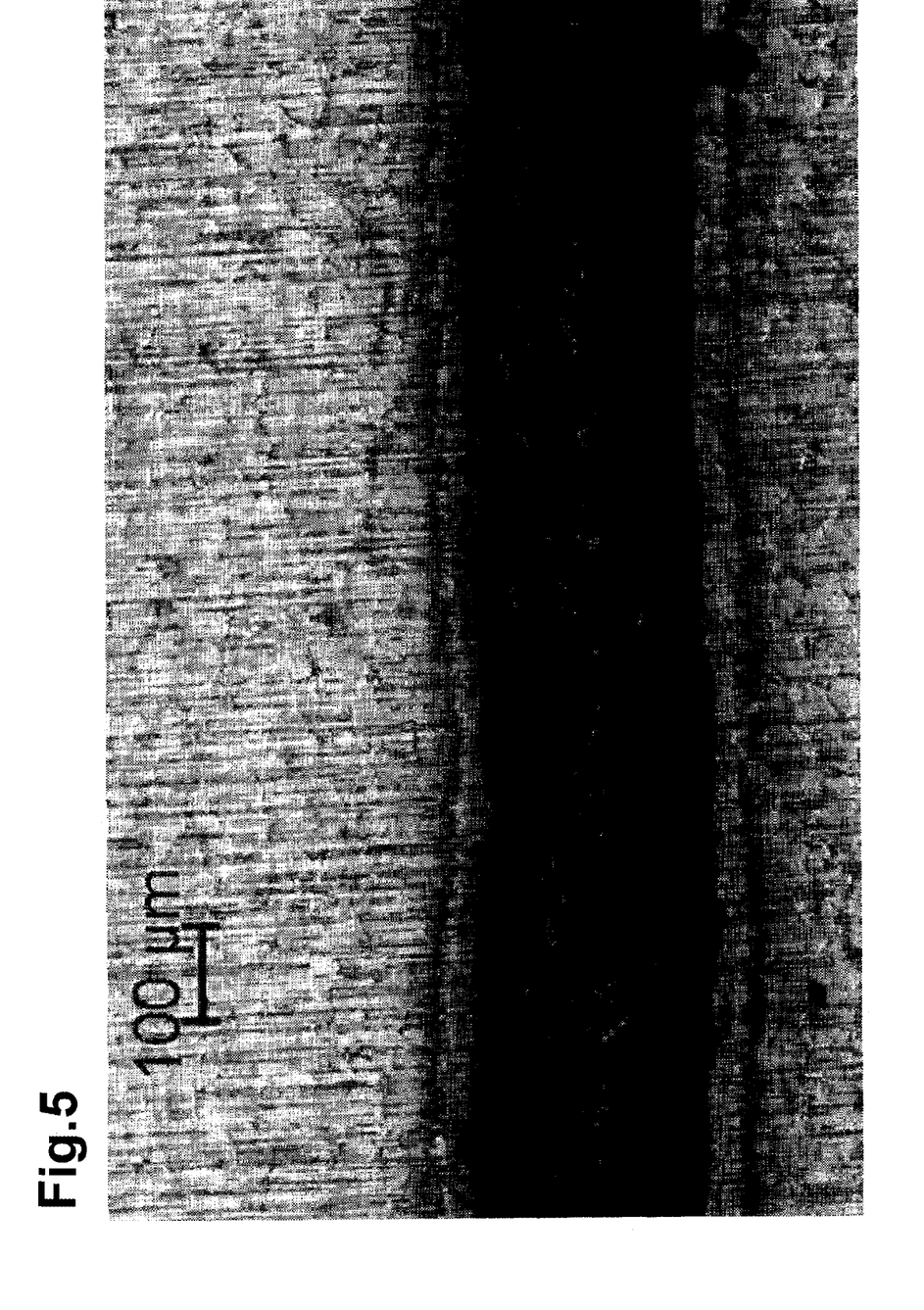
FIG. 5 illustrates a laser microscope image of a weld mark formed on a blade in the welding process according to one or more aspects of the disclosure.

As an example, FIG. 5 illustrates a weld mark formed by the welding process using a fiber laser welding machine ML-6700A (manufactured by MIYACHI CORPORATION) to weld a blade made of stainless steel (e.g., a thickness of 0.1 mm) to a supporting member made of electrolytic zinc-coated carbon steel sheet (e.g., a thickness of 1.2 mm). In the welding process, a continuous wave laser was used as a laser beam, and the laser beam was moved at a speed of 200 mm/sec with respect to the blade, where a spot diameter of the laser beam was 0.2 mm, and power of the laser beam was 300 W. The weld mark of FIG. 5 was observed using a laser microscope VK-X200 series (manufactured by KEYENCE CORPORATION).

While the disclosure has been described in detail with reference to example embodiments thereof, it is not limited to such examples. Various changes, arrangements and modifications may be applied to the detailed configuration without departing from the spirit and scope of the disclosure. In the description below, common parts have the same reference numerals as those of the above-described embodiments, and the detailed description of the common parts is omitted.

As described above, the blade 41 and the supporting member 42 may be welded to each other by moving the laser beam 82 with respect to the blade 41 while the laser beam 81 is continuously irradiated onto the blade 41. However, the welding method of the blade 41 and the supporting member 42 might not be limited to that example. For example, the blade 41 and the supporting member 42 may be welded to each other by moving the laser beam 82 with respect to the blade 42 while the laser beam 81 is intermittently irradiated onto the blade 41.

Figure 6A:
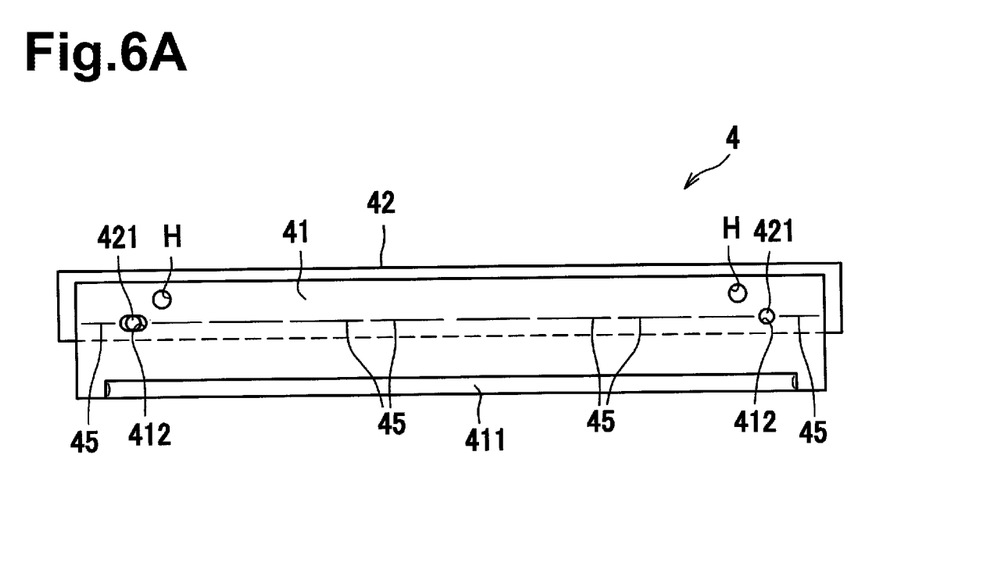
FIG. 6A illustrates a blade unit in a first variation according to one or more aspects of the disclosure.
Figure 6B:
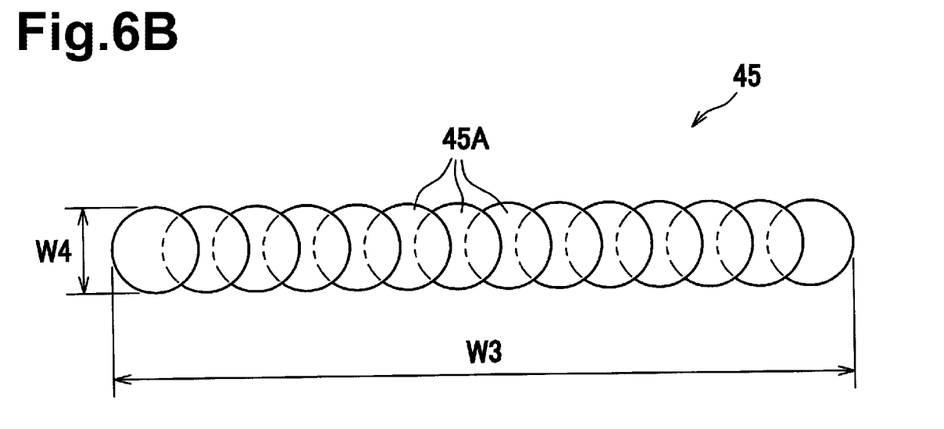
FIG. 6B is an enlarged view of a larger weld mark in the first variation according to one or more aspects of the disclosure.

More specifically, as depicted in FIGS. 6A and 6B, the blade 41 may have a combined weld mark 45 at a plurality of locations in the longer direction, wherein each combined weld mark 45 may include a plurality of weld marks 45A arranged in the longer direction. A weld mark 45A may refer to a welded portion (e.g., a modified portion of the blade and/or supporting member) that may be formed by one continuous application (e.g., one pulse) of the laser beam 81.

Each weld mark 45A may have a shape (e.g., circular shape) and size corresponding to the shape and size (e.g., diameter) of the laser beam used to create the weld mark 45A. In the combined weld mark 45, adjacent weld marks 45A may overlap each other. Thus, in the combined weld mark 45, a dimension W3 in the longer-side of the blade 41 may be longer than a dimension W4 in the shorter-side of the blade 41.

To form such a combined weld mark 45 on the blade unit 4, in the welding process, while the laser beam 81, such as a pulsed laser or a continuous wave laser, is irradiated onto the blade 41, the laser beam 81 may be moved with respect to the blade 41 at a speed which may allow the laser beam 81 to form adjacent weld marks 45A that may overlap each other. For example, a fiber laser or an yttrium aluminum garnet ("YAG") laser may be adopted as the pulsed laser. In particular, a fiber laser (which emits a laser beam with a relatively small diameter) may be used so that the welding process for creating overlapping weld marks does not cause overheating and/or deformation of the blade 41 and/or the supporting member 42.

Figure 7:
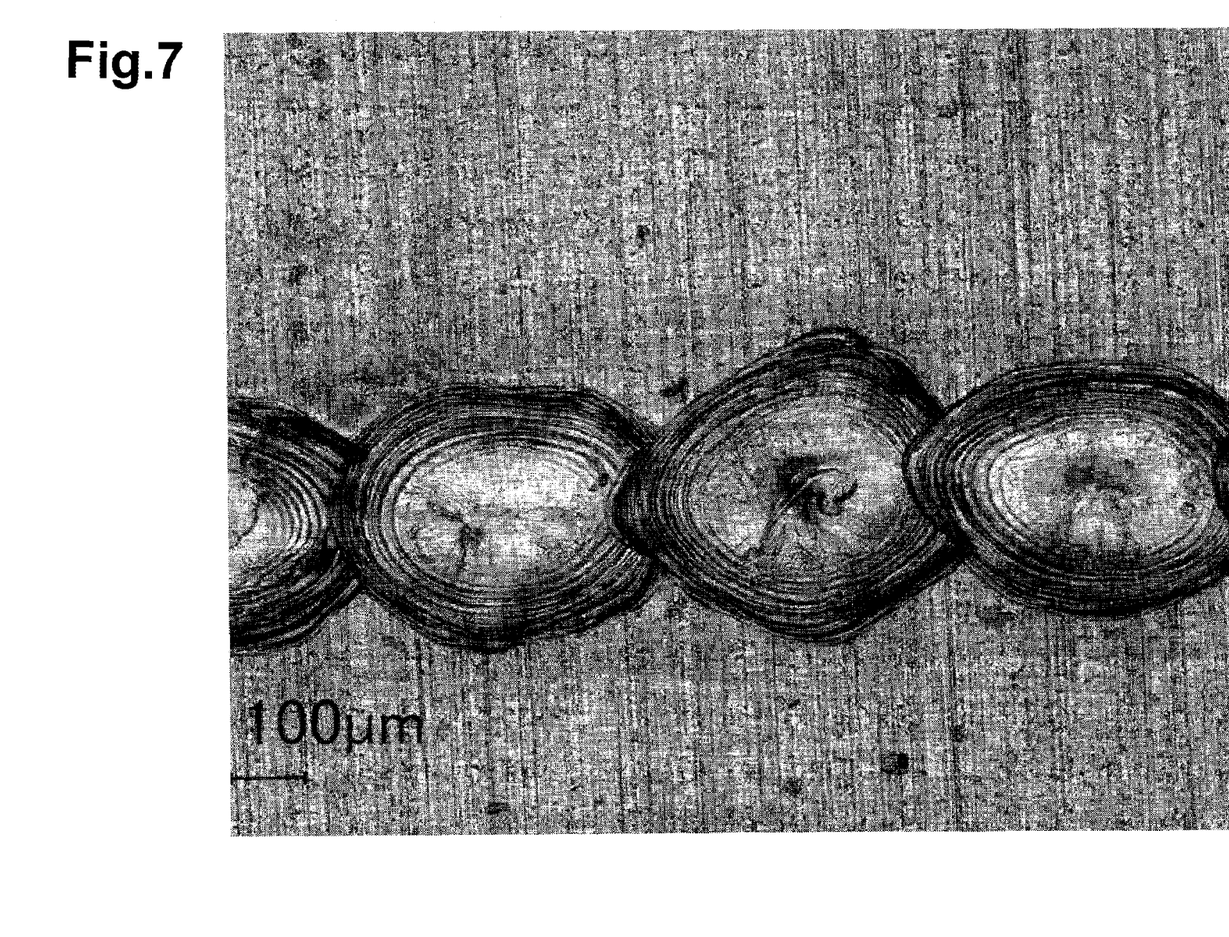
FIG. 7 illustrates a laser microscope image of a weld mark formed on the blade in the welding process in the first variation according to one or more aspects of the disclosure.

As an example, FIG. 7 illustrates a weld mark formed on a blade as a result of welding in which a laser beam such as a pulsed laser was moved at a speed of 200 mm/sec with respect to the blade, where a spot diameter of the laser beam was 0.2 mm, a pulse width of the laser beam was 1.0 msec, and power of the laser beam was 400 W. The welding machine, the blade, and the supporting member may be the same as those used in the example depicted in FIG. 5. The weld mark was observed using the VK-X200 series laser microscope (manufactured by KEYENCE CORPORATION).

Figure 8:
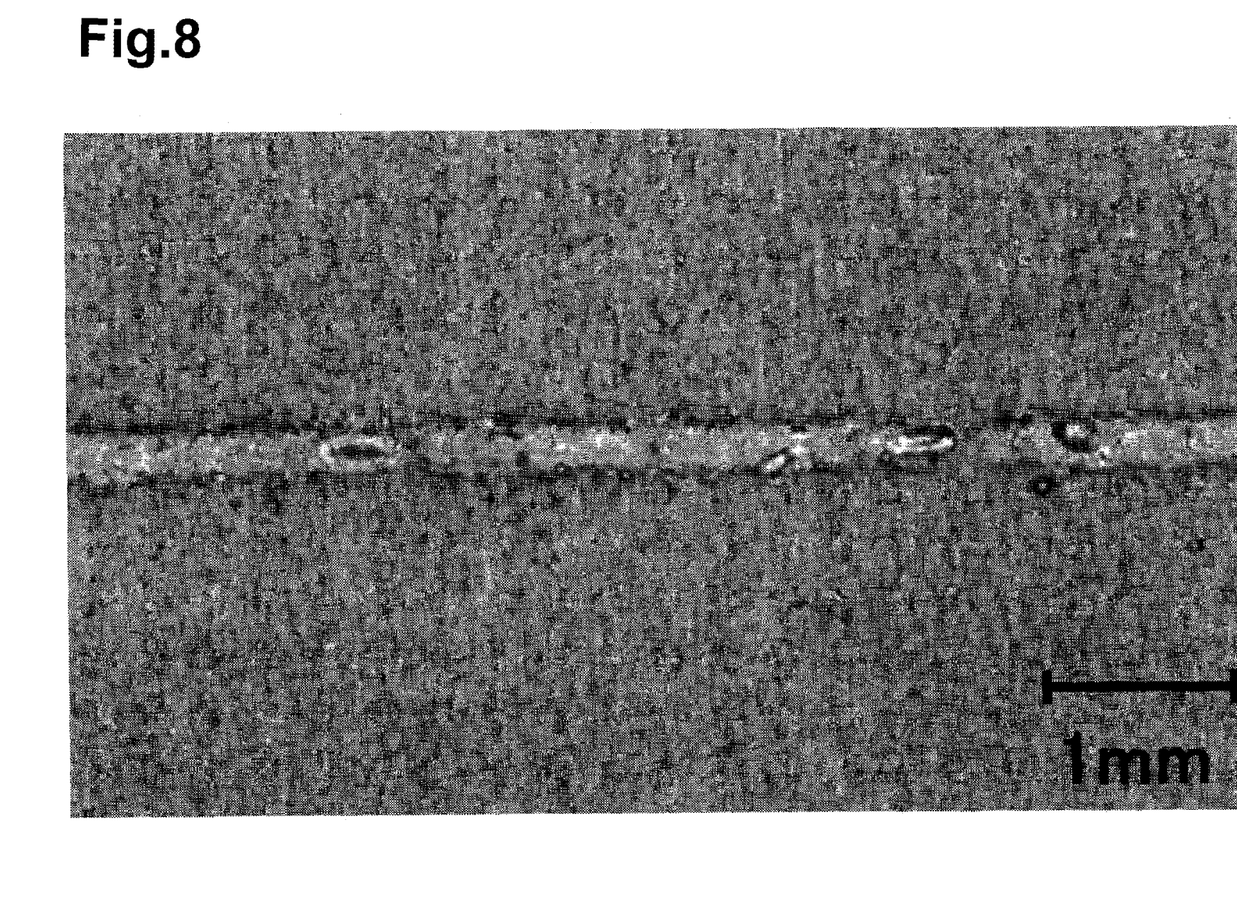
FIG. 8 illustrates a 3D measuring microscope image of a weld mark formed on the blade in another variation according to one or more aspects of the disclosure.

FIG. 8 illustrates another example in which a plurality of weld marks that are elongated in the longer direction of the blade 41 are arranged along the longer direction. The weld marks illustrated in FIG. 8 may be formed as a result of welding in which a laser beam such as a continuous wave laser was moved at a speed of 200 mm/sec with respect to the blade, where a spot diameter of the laser beam was 0.1 mm, a pulse width of the laser beam was 14 msec, and power of the laser beam was 200 W. The welding machine, the blade, and the supporting member may be the same as those used in the example depicted in FIG. 5. The weld marks were observed using the VR-3000 series One-Shot measuring microscope (manufactured by KEYENCE CORPORATION).

Figure 9A:
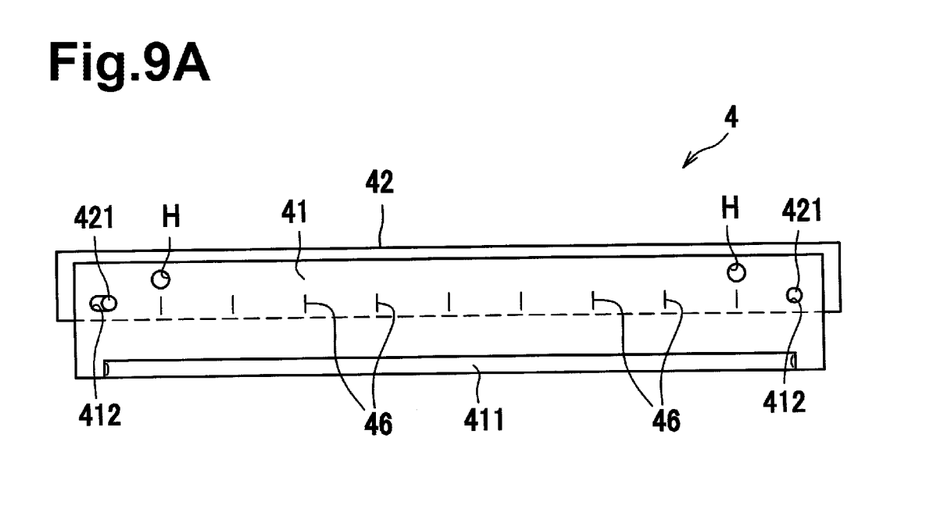
FIG. 9A illustrates a blade unit in a second variation according to one or more aspects of the disclosure.
Figure 9B:
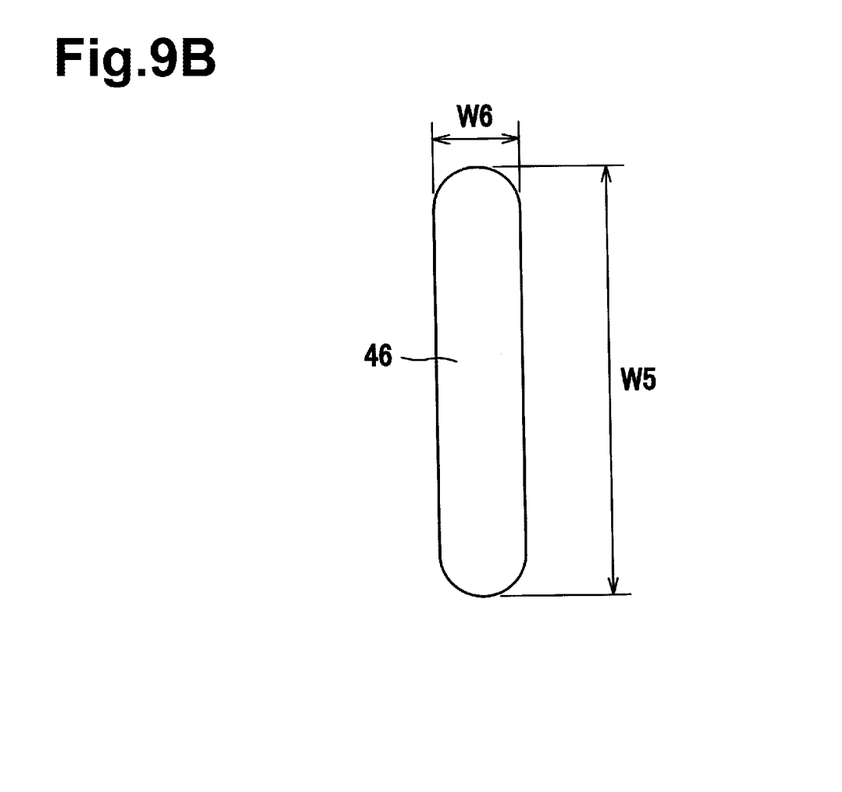
FIG. 9B is an enlarged view of a weld mark in the second variation according to one or more aspects of the disclosure.

As described above, each of the weld marks 43 and 44 may have the elongated shape extending in the longer direction of the blade 41 (e.g., the particular direction). However, the shape of the weld mark might not be limited to that example. For example, as depicted in FIGS. 9A and 9B, each weld mark 46 may have an elongated shape extending in the shorter direction of the blade 41.

In each weld mark 46, a dimension W5 in the shorter direction of the blade 41 may be longer than a dimension W6 in the longer direction of the blade 41. The weld marks 46 may be formed at a plurality of locations, respectively, in the longer direction of the blade 41.

It may be preferable that ends, which may be located closer to the contact portion 411, of the plurality of weld marks 46 are arranged in a straight line extending parallel to a direction that the contact portion 411 may extend such that force is exerted uniformly on the contact portion of the contact portion 411 and the developing roller 2.

Figure 10:
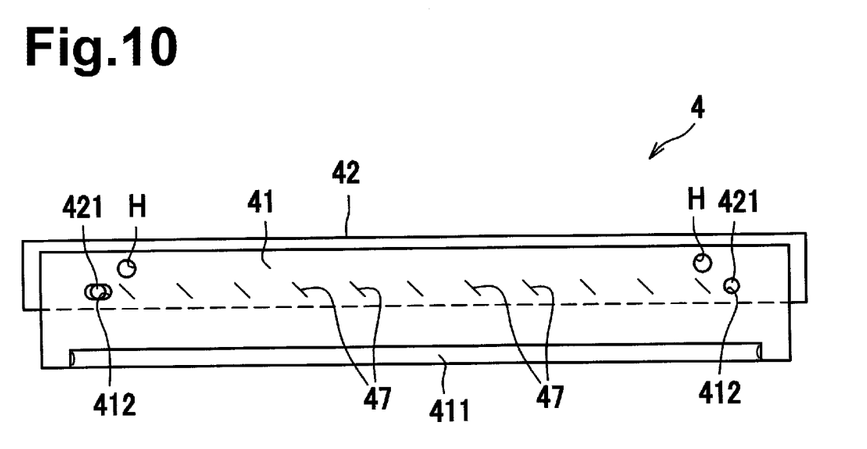
FIG. 10 illustrates a blade unit in a third variation according to one or more aspects of the disclosure.

As depicted in FIG. 10, each weld mark 47 may have an elongated shape extending in a direction intersecting the longer direction of the blade 41 and the shorter direction of the blade 41. In other words, the weld marks 47 may extend at an angle to the longer direction or the shorter direction of the blade 41.

As described above, the weld marks (e.g., the first weld mark 43 and the second weld marks 44) may be formed at one location in the shorter direction of the blade 41. However, the number of locations where the weld marks may be formed might not be limited to that example. In other embodiments, for example, two or more weld marks may be formed at respective positions in the shorter direction of the blade 41 so as to be arranged along the shorter direction of the blade 41.

As described above, all the weld marks (e.g., the first weld mark 43 and the second weld marks 44) may have the greater dimension in the longer direction of the blade 41 than the dimension in the shorter direction of the blade 41. However, the shape of the weld marks formed on the blade 41 might not be limited to that example. For example, the second weld mark(s) 44 may have a spot-like shape in which a dimension in the longer direction of the blade 41 and a dimension in the shorter direction of the blade 41 may be substantially equal to each other. That is, only one of the weld marks formed on the blade 41 may have a greater dimension in the first direction than a dimension in a direction perpendicular to the first direction.

As described above, the blade 41 may be welded to the supporting member 42 at the plurality of locations. However, the method of welding the blade 41 might not be limited to that example. In other embodiments, for example, the blade 41 might only have the first weld mark 43 and be joined to the supporting member 42 by welding at one location.

As described above, in the welding process, the laser beam 81 may be moved with respect to the blade 41. However, the manner of moving the laser beam 81 with respect to the blade 41 might not be limited to that example. In other embodiments, for example, the blade 41 and the supporting member 42 may be moved with respect to the laser beam 81 to move the laser beam 81 with respect to the blade 41 (or the blade 41 may be moved with respect to the laser beam 81).

In still other embodiments, the laser beam 81 and the set of the blade 41 and the supporting member 42 may be moved at the same time.

Figure 11:
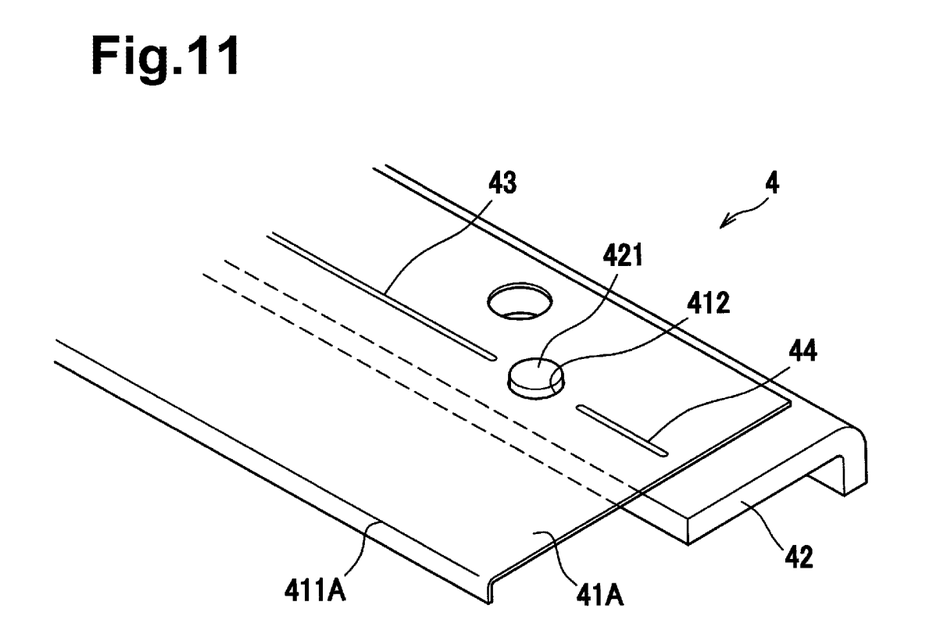
FIG. 11 is a perspective view depicting a blade unit in a fourth variation according to one or more aspects of the disclosure.

As described above, the blade 41 may comprise the contact portion 411 protruding from the blade 41. However, the configuration of the blade 41 might not be limited to that example. In other embodiments, for example, as depicted in FIG. 13, the blade 41A might not comprise a contact portion made of, for example, rubber, but may comprise a bent portion 411A in which the distal end portion of the blade 41A may be bent toward the supporting member 42 (e.g., toward a side opposite to the developing roller 2). The bent portion 411A (e.g., the distal end of the blade 41) may directly contact the roller body 2A of the developing roller 2.

Figure 12:
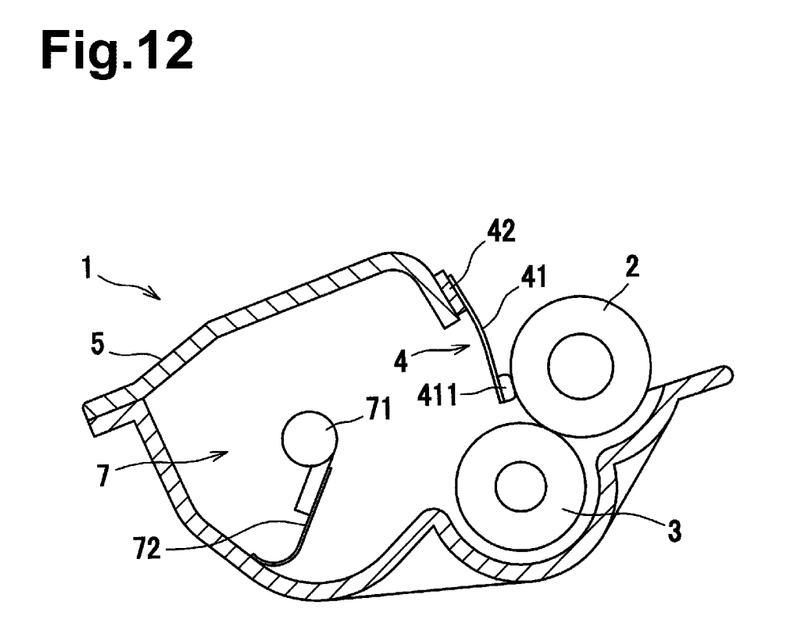
FIG. 12 is a sectional view depicting a developing device in a fifth variation according to one or more aspects of the disclosure.

As described above, the distal end portion of the blade 41 may be placed on the developing roller 2, and the blade 41 may be pinched by the supporting member 42 and the developing case 5. However, the configuration of the blade unit 4 might not be limited to that example. In other embodiments, for example, as depicted in FIG. 12, the supporting member 42 to which the blade 41 may be welded may be fixed to the developing case 5 directly while the supporting member 42 is pinched by the blade 41 and the developing case 5. In the blade unit 4, the distal end portion of the blade 41 (e.g., the contact portion 411) may contact the developing roller 2 from the conveyor member 7 side. Further, a surface, which may be opposite to the surface 41F having the contact portion 411 thereon, of the blade 41 may be supported by the supporting member 42.

As described above, the developing roller 2 comprising the roller body 2A and the shaft 2B may be illustrated as the developer carrier. However, in other embodiments, for example, the developer carrier might not be limited to that example. In other embodiments, for example, a brush roller, a developing sleeve, or a belt-shaped developer carrier may be used as the developer carrier.

As described above, the contact portion 411 (e.g., the distal end) of the blade 41 may be in direct contact with the roller body 2A of the developing roller 2 (as an example of the developer carrier). However, the configuration of the blade might not be limited to that example. In other embodiments, for example, the blade may be disposed such that its distal end portion may be substantially 0.1-1.0 mm apart from the roller body 2A.

As described above, the stainless steel may be adopted as the metallic material for constituting the blade 41. However, the material of the blade 41 might not be limited to that example. For example, the blade 41 may be made of, for example, steel used for springs, phosphor bronze, beryllium copper, or carbon tool steel. In a case where the steel for springs or the carbon tool steel is adopted, a nickel, chromium, or zinc coating may be applied to the blade 41 for rustproof.

As described above, the electrolytic zinc-coated carbon steel sheet may be used as the metallic material for constituting the supporting member 42. However, the configuration of the supporting member 42 might not be limited to that example. In other embodiments, for example, the supporting member 42 may be made of a cold rolled steel plate or a tin plate, or a plate made of one of the cold rolled steel plate and the tin plate whose surface may be applied with treatment such as Parkerizing, chromating, or nickel coating. The supporting member 42 may also have a coating including press oil thereon.

What is claimed is:

1. An apparatus comprising:
   a developer carrier;
   a blade disposed adjacent to the developer carrier; and
   a supporting member configured to support the blade,
   wherein the blade comprises a weld mark joining the blade to the supporting member,
   wherein a first dimension of the weld mark in a first direction is greater than a second dimension of the weld mark in a second direction perpendicular to the first direction,
   wherein a third dimension of the weld mark in a third direction, the third direction being perpendicular to the first direction and the second direction, is a dimension of the thickness of the blade, and
   wherein the first direction is approximately parallel to a direction of a longest dimension of the blade.

2. The apparatus according to claim 1, wherein first dimension is 1.1 times or greater than the second dimension.

3. The apparatus according to claim 1, wherein the first dimension is in a first range of 0.2 to 250 mm, and the second dimension is in a second range of 0.1 to 6.0 mm.

4. The apparatus according to claim 1, wherein the supporting member and the blade are welded to each other by a fiber laser.

5. The apparatus according to claim 1, wherein the supporting member and the blade are welded to each other by a yttrium aluminum garnet ("YAG") laser.

6. The apparatus according to claim 1, wherein the blade has a thickness of 0.05 to 2.5 mm.

7. The apparatus according to claim 1, wherein the blade comprises metallic material and the supporting member comprises metallic material.

8. A blade assembly comprising:
   a blade configured to regulate an amount of developer on a developer carrier; and
   a supporting member configured to support the blade,
   wherein the blade comprises a weld mark joining the blade to the supporting member,
   wherein a first dimension of the weld mark in a first direction is greater than a second dimension of the weld mark in a second direction perpendicular to the first direction,
   wherein a third dimension of the weld mark in a third direction, the third direction being perpendicular to the first direction and the second direction, is a dimension of the thickness of the blade,
   wherein the first dimension is in a first range of 0.2 to 250 mm, and the second dimension is in a second range of 0.1 to 6.0 mm, and wherein the weld mark is one of a single weld mark and a combined weld mark that is formed by a plurality of weld marks partially overlapping each other.

9. The blade assembly according to claim 8, wherein the first dimension is 1.1 times or greater than a second dimension.

10. The blade assembly according to claim 8, wherein the first direction is approximately parallel to a direction of a longest dimension of the blade.

11. The blade assembly according to claim 8, wherein the first direction is approximately perpendicular to a direction of a longest dimension of the blade.

12. The blade assembly according to claim 8, wherein the supporting member and the blade are welded to each other by a fiber laser.

13. The blade assembly according to claim 8, wherein the supporting member and the blade are welded to each other by a yttrium aluminum garnet ("YAG") laser.

14. The blade assembly according to claim 8, wherein the blade has a thickness of 0.05 to 2.5 mm.

15. The blade assembly according to claim 8, wherein the blade comprises metallic material and the supporting member comprises metallic material.

16. A method for manufacturing a developing device, comprising a developer carrier, a blade disposed adjacent to the developer carrier, and a supporting member configured to support the blade, the method comprising:
　　placing the blade in contact with the supporting member; and
　　welding comprising irradiating a laser beam from a welding machine onto the blade, while moving one of the laser beam and the blade to form a weld mark joining the blade to the supporting member,
　　wherein the welding comprises forming the weld mark having the first dimension that is in a first range of 0.2 to 250 mm, and the second dimension that is in a second range of 0.1 to 6.0 mm, and
　　wherein the weld mark is one of a single weld mark and a combined weld mark that is formed by a plurality of weld marks partially overlapping each other.

17. The method according to claim 16, wherein the moving of one of the laser beam and the blade comprises linearly moving one of the laser beam and the blade.

18. The method according to claim 16, wherein the welding comprises forming the weld mark having a first dimension of the weld mark in a first direction that is greater than a second dimension of the weld mark in a second direction perpendicular to the first direction, and a third dimension of the weld mark in a third direction, the third direction being perpendicular to the first direction and the second direction, is a dimension of the thickness of the blade.

19. The method according to claim 18, wherein the welding comprises irradiating the laser beam such that the first dimension is 1.1 times or greater than the second dimension.

20. The method according to claim 16, wherein the irradiating of the laser beam comprises irradiating a pulse laser.

21. The method according to claim 16, wherein the irradiating of the laser beam comprises irradiating a continuous wave laser.

22. The method according to claim 16, wherein the welding comprises using a yttrium aluminum garnet ("YAG") laser.

23. The method according to claim 16, wherein the welding comprises using a fiber laser.

24. The method according to claim 18, wherein the welding comprises forming the weld mark having the first direction that is parallel to a direction of the longest dimension of the blade.

25. The method according to claim 18, wherein the welding comprises forming the weld mark having the first direction that is perpendicular to a direction of the longest dimension of the blade.

* * * * *